Patented Oct. 13, 1925.

1,557,174

UNITED STATES PATENT OFFICE.

GEORGE W. LANGLEY AND ARGUS A. HOWELL, OF GREENBRIER, ARKANSAS; SAID HOWELL ASSIGNOR OF HIS ENTIRE RIGHT TO DAN N. WARD, OF GREENBRIER, ARKANSAS.

LEATHER-TANNING COMPOUND.

No Drawing.     Application filed August 23, 1922. Serial No. 583,920.

*To all whom it may concern:*

Be it known that GEORGE W. LANGLEY and ARGUS A. HOWELL, citizens of the United States of America, residing at Greenbrier, in the county of Faulkner and State of Arkansas, have invented a certain Leather-Tanning Compound, of which the following is a specification.

Our invention relates to compounds to be used in connection with the process of tanning and dressing animal hides and its principal objects are to provide a compound that will act speedily and effectively in tanning and dressing the hide and at the same time will permit the tanning process to be carried out in an economical and advantageous manner.

Further the invention provides a compound the elements of which are so intermingled as to chemically react so that upon applying the same to the animal hide it will readily penetrate the latter and in the end lend a beautiful finish to the leather.

With the preceding and other objects and advantages that will become apparent from the following disclosure the invention consists of the combination of ingredients, manner of preparation, and proportion as is hereinafter related and set forth in the annexed claims.

The compound consists of the following ingredients compounded in the proportions enumerated:

1. ¼ pound of extract of sumach;
2. ½ pound of extract of wild cherry bark;
3. 5 pounds of gum gambier; and
4. 10 gallons of water.

First the sumach is prepared by boiling four pounds of sumach leaves and berries and three gallons of water for one hour. Whenever sumach leaves and berries are not obtainable, boil six pounds of sumach bark and roots in four gallons of water for 1½ hours. Second, the wild cherry extract is prepared by boiling seven pounds of wild cherry bark with five gallons of water for two hours. The sumach and wild cherry thus prepared are mixed with the gum gambier and water.

In treating the hides with the compound, the hide is immersed in a bath of this compound for different lengths of time, i. e., we would say the light hides from ten to twenty-four hours; upper leather from four to five days, and heavy harness or sole leather from eight to twelve days. In connection with our improved composition we wish to emphasize the fact that it may be used for tanning hides from which the hair has not been removed and will have the same effect as if the hair were removed.

What we claim as new and desire to protect by Letters Patent is:

1. A tanning composition comprising extract of sumach, extract of wild cherry bark, gum gambier, and water.

2. A tanning composition comprising extract of sumach, ¼ lb.; extract of wild cherry bark, ½ lb.; gum gambier, 5 lbs.; and 10 gallons of water.

In testimony whereof we affix our signatures.

GEORGE W. LANGLEY.
ARGUS A. HOWELL.